United States Patent [19]

Ammedick-Naumann et al.

[11] Patent Number: 5,264,240
[45] Date of Patent: Nov. 23, 1993

[54] CONDIMENT

[75] Inventors: Claudia Ammedick-Naumann, Wüstenrot; Hans Bohrmann, Talheim, both of Fed. Rep. of Germany

[73] Assignee: CPC International Inc., Englewood Cliffs, N.J.

[21] Appl. No.: 28,736

[22] Filed: Mar. 8, 1993

Related U.S. Application Data

[63] Continuation of Ser. No. 787,711, Nov. 4, 1991, abandoned, which is a continuation of Ser. No. 472,985, Jan. 31, 1990, abandoned.

[30] Foreign Application Priority Data

Feb. 6, 1989 [DE] Fed. Rep. of Germany ....... 3903507

[51] Int. Cl.$^5$ .......................... A23L 1/22; A23L 1/238
[52] U.S. Cl. ......................................... 426/650; 426/7; 426/42; 426/589
[58] Field of Search ................. 426/650, 589, 643, 42, 426/7

[56] References Cited

U.S. PATENT DOCUMENTS

| 2,746,869 | 5/1956 | Ellis | 426/650 |
| 4,705,693 | 11/1987 | Mitra et al. | 426/634 |

FOREIGN PATENT DOCUMENTS

| 61-28362 | 2/1986 | Japan | 426/650 |
| 6131062 | 2/1986 | Japan | 426/650 |
| 1132350 | 11/1987 | Japan | 426/650 |

*Primary Examiner*—Joseph Golian

[57] ABSTRACT

The invention relates to the use of fenugreek (*Trigonella foenum-graecum*) for refining the taste of soy sauce, fish sauce, or combinations thereof and to solid and liquid condiments produced by the inclusion of fenugreek in soy sauce, fish sauce, or combinations thereof.

14 Claims, No Drawings

CONDIMENT

This application is a continuation of U.S. Ser. No. 07/787,711 filed Nov. 4, 1991, which is a continuation of U.S. Ser. No. 07/472,985 filed Jan. 31, 1990, both of which are now abandoned.

The present invention relates to the use of fenugreek for refining the taste of soy sauce or fish sauce, or combinations thereof, and to condiments containing soy sauce or fish sauce, or combinations thereof, and fenugreek.

Soy sauce and fish sauce are known condiments that are regularly used especially in the Asian cuisine. However, they both have an inherent, characteristic taste which is objected to when used in European cuisine. Therefore, they are used in special preparations only, and as a rule only in minor concentrations. This is also true for seasoning sauces containing soy or fish sauce, such as Sukiyaki or steak sauce, used in combination with other seasoning ingredients.

Fenugreek (*Trigonella foenum-graecum*, also called Greek hay) is a plant belonging to the family of papilionaceous plants whose seeds have been known as a spice since ancient times. The seeds have a strong aromatic smell and taste somewhat bitter and slimy, with a peculiar after-taste. The seeds obtain a more pleasing taste by subjecting them to a heat treatment. During roasting or cooking, the unpleasant smell and taste change to a more pleasing aroma and flavor.

Due to the rather unpleasant smell and taste, the extremely hard seeds of yellowish brown color with a length of up to about 4 mm are seldom used as a spice in the cuisine of Central and Northern Europe. However, this spice is popular in India, Northern Africa, America, China and in the Balkan States. Fenugreek is employed mostly in ground form, in mixed spices, particularly in curry powders. In India, fenugreek is almost always present in curry powders, and the roasted seeds are used as a coffee substitute there. It has also been used as a flavoring for cheese.

Surprisingly, it has been found that fenugreek, which has so far been used only a little in European cooking because of its foreign smell and taste, is excellently suited for matching the taste of soy sauce and fish sauce, to the European taste.

Hydrolyzed Vegetable Proteins (HVPs) are very popular in Central Europe, the most famous is the product that is often named according to its inventor Julius Maggi. It is HVP obtained by the hydrolysis of protein carriers of vegetable and animal origin with hydrochloric acid, and with aromatic herbs occasionally being added thereto. HVPs, in and of themselves, have not only gained great importance in European cooking, but they are also the basis for a large number of products produced by the Maillard reaction which have a meat-like or a different spicy flavor, and are nowadays widely used in products such as bouillon cubes, gravy, etc.

An especially characteristic taste component of condiments is the so-called HVP lactone (3-hydroxy-4-methyl-5-ethyl-(5H)-furan-2-one) which is formed only under the drastic reaction conditions of acid hydrolysis (temperatures above 100° C. and under pressure).

The object of the invention, therefore, primarily resides in making available a product which has an HVP-like taste without containing flavoring lactone. Moreover, the product according to the invention should be as similar as possible to known food HVPs in its other properties and possibilities of use so that it can serve as a substitute for the Maillard products which are usually made from HVPs.

Surprisingly, this object can be solved by a simple mixing operation. It is therefore possible to dispense with the acid hydrolysis, that requires high temperatures and pressures, and with the steps subsequent to hydrolysis such as neutralization and separation of the humic acids.

Thus, the subject matter of the invention is that of a condiment comprising soy sauce or fish sauce, or combinations thereof, and further comprising salt, ground fenugreek seeds, either in untreated or roasted form, or fenugreek extract and possibly water.

The condiment according to the invention generally has the following composition: from about 0 to about 70% soy sauce, from about 0 to about 70% fish sauce, or combinations thereof, wherein the combined amount of the sauces is from about 10 to about 85% by weight of the condiment. The condiment further comprises from about 5 to about 20% common salt, from about 1 to about 30% fenugreek, and from about 0 to about 80% water.

Usually, commercially available products are employed individually as soy sauce or fish sauce. Preferably, a fish sauce from a Thailand provenience is used. Fish sauce alone creates a less strong overall taste, however, a combination of soy sauce and fish sauce when mixed with fenugreek seeds in accordance with the invention, results in a condiment with a very round overall taste.

In a further development of the invention it has been found that a condiment comprising soy or fish sauce, or combinations thereof, and refined in its taste by fenugreek can be further refined in its taste by additional additives, resulting in a condiment which is at least equal to the known European HVPs.

An intensification of the spicy taste is obtained by adding dried leaves or constituents of the roots of umbelliferae or apiaceae; such as lovage (*Levisticum officinale Koch*), celery (*Apium graveolens L.*), *Angelica acutiloba L.*, *Cnidium officinale L.*, or *Angelica utilis L.* The additives can be used in powdered form, or as an extract, such as a lovage extract which contains about 80% dry substance. The round harmonic taste becomes more spicy and piquant by the addition of lovage and, thus, more similar to the characters of known HVPs.

Matching of the acidity character of the present condiment to that of known HVPs can be achieved by the addition of conventional food acids, such as citric acid or tartaric acid, in particular however, by the addition of tamarind powder. The mild, round acidity of tamarind enhances the taste of the present condiment without influencing it towards a specific taste direction. Instead of tamarind, it is also possible to use tamarind substitutes of natural origin with a sourish taste, such as *Asam Gelugar*. In comparison therewith, citric acid or tartaric acid create a somewhat striking and rough taste.

Moreover, for rounding off the taste, additional protein carriers, such as yeast extract, may be added, also glutamate for matching the glutamic acid which is contained in conventional HVP.

The additives mentioned are added in general in the following proportions: lovage root from about 0.1 to about 10%, preferably about 0.1 to about 5%, ground celery leaves from about 0.1 to about 10%, tamarind powder about from 0.1 to about 10%, citric acid from about 0.1 to about 5%, yeast extract from about 1 to about 30%, preferably about 1 to about 3%, and glutamate about 1 to about 10%. A preferred embodiment for the liquid condiment comprises about 10 to about 50%, preferably about 10 to about 15% soy sauce; about 5 to about 50%, preferably about 5 to about 10% fish sauce; about 10 to about 20%, preferably about 15 to about 20% common salt; about 1 to about 30%, preferably about 1 to about 5% fenugreek extract; about 20 to about 70%, preferably about 50 to about 55% water; about 0.1 to about 5%, preferably about 0.1 to about 0.5% lovage extract; about 1 to about 5%, preferably about 2 to about 5% tamarind powder; about 1 to about 30%, preferably about 1 to about 3% yeast extract; about 2 to about 8%, preferably about 4 to about 6% glutamate.

For the purposes of the present invention the fenugreek seeds may be ground and used as powder. The taste of the seeds however is slightly bitter and floury. Therefore, the seeds are preferably slightly roasted prior to grinding.

Instead of the seed powder an extract (ethanol not water) from the fenugreek seeds may be used as well. Suitable extracts are commercially available. The preferred fenugreek extract used is an extract of somewhat roasted fenugreek seeds, and is preferably slightly alcoholic.

In case of using a fenugreek extract, it is expedient that the extract, in liquid or paste form, is absorbed on common or table salt for better distribution.

For producing liquid products the liquid mixture is allowed to mature subsequent to mixing. It may be heated to reduce the time of maturing. Heating from about 70 to about 90° C., preferably to about 80° C., for a period of from about 1 to about 2 hours, preferably one hour, has turned out to be expedient.

Heating is especially advisable when fenugreek seeds are used so that the substances active in taste and smell are extracted from the seeds into the liquid medium, the same being also applicable when tamarind powder is added. Subsequent to heating, the mixture is filtered so that a clear solution is obtained.

In a typical recipe for a liquid condiment about 10 to about 50% soy sauce or fish sauce, or a combination thereof, about 10 to about 20% common salt and about 20 to about 70% water are mixed with either about 10 to about 30% untreated ground fenugreek seeds or about 10 to about 30% roasted ground fenugreek seeds or about 1 to about 20% fenugreek extract (80% dry substance).

Instead of a liquid condiment sauce, it is also possible to produce a dry condiment when the corresponding dry products are used without the addition of water. Dry products of this type can be used for making products analogous to granular bouillon as well as other products containing HVPs as taste carrier. For preparing the dry products, the constituents are simply mixed together.

Surprisingly, it is possible by proceeding in accordance with the present invention, without the use of acid hydrolysis, to make products by a pure mixing process, which are very similar or even superior to the table condiments which are very popular in the German-speaking areas. Moreover, these products do not contain HVP lactone or other constituents typical of HVPs, but rather the products according to the invention contain only the protein constituents obtained by natural fermentation. This is in contrast to the proteins of conventional HVPs that are subjected to acid hydrolysis.

The invention can be used not only as a solid or liquid seasoning, such as an HVP, but also in all spheres of food manufacture in which seasonings based on HVPs are employed. This includes products such as granular bouillons, bouillon and soup cubes, dried soups, gravies and sauces, canned goods, and in reaction flavorings produced by the Maillard reaction. In addition thereto, the products according to the invention may also be used for enhancing the taste or restoring the full taste of conventional HVPs in case the flavor substances typical of HVPs have been extracted therefrom by a solvent extraction, such as with acetic ether, or by other processing methods, such as intensive decoloring.

The following examples are meant to be illustrative, and are not meant to be limiting in any manner.

EXAMPLE 1

In this example soy sauce is mixed with untreated or roasted fenugreek seed powder or extract for taste refining:

1a)
20% soy sauce
12% fenugreek seeds (untreated, ground)
49.5% water

As a consequence of the slime substances in the fenugreek, a gel-like product is obtained which is no longer flowable and which cannot be filtered. The taste is unfinished, "green", leguminous, while however a distinct HVP-like seasoning taste is perceivable, although it does not yet satisfy the requirements to be met by a condiment.

1b)
20% soy sauce
18.5% salt
12% fenugreek seeds (roasted, ground)
49.5% water

The consistency of the product is somewhat thinner than in example 1a), since slime substances are partly eliminated during roasting. The product is not filtrable. The "green" flavor of example 1a has largely disappeared, the taste is somewhat more harmonic and no longer leguminous, and there is a clear spicy taste.

1c)
20% soy sauce
18.5% common salt
2% fenugreek extract (80% dry substance)
59.5% water The product is of thin, fluid consistency, comparable to an HVP, and it is filtrable. It has a harmonic taste similar to an HVP.

EXAMPLE 2

The preparations are the same as in Example 1, except that fish sauce instead of soy sauce is mixed with untreated and, respectively, roasted fenugreek seeds and fenugreek extract, respectively.

The physical and taste properties are comparable to those described in examples 1a to 1c. However, fish sauce introduces a less strong overall taste into the mixture, but the slightly fishy inherent taste of the fish sauce is masked.

EXAMPLE 3

12% soy sauce
8% fish sauce
18.5% common salt

12% fenugreek seeds (roasted, ground)
49.5% water

This combination of soy sauce and fish sauce produces the desired rounded overall taste.

EXAMPLE 4

4a)
12% soy sauce
8% fish sauce
18.5% common salt
2% fenugreek extract
1% lovage root powder
58.5% water In this mixture, the spicy taste is further intensified by the addition of lovage root powder. The rich harmonic taste has become more spicy and more piquant and is even more similar to the character of classical HVPs.

4b)
12% soy sauce
8% fish sauce
18.5% common salt
2% fenugreek extract
1% celery leaves (ground)
58.5% water The taste is a bit stronger than that of example 4a, but is closer to the taste of HVP than without the addition of celery leaves.

EXAMPLE 5

5a)
12% soy sauce
8% fish sauce
18.5% common salt
2% fenugreek extract
1% lovage root powder
2% tamarind powder
56.5% water The mild, round acidity of tamarind enhances the taste as a whole without influencing it towards a specific direction of taste.

5b)
12% soy sauce
8% fish sauce
18.5% common salt
2% fenugreek extract
1% lovage root powder
2% citric acid
56.5% water The acid yields a somewhat "striking", rough taste, the overall impression is not as round as in example 5a.

EXAMPLE 6

2% soy sauce
8% fish sauce
18% common salt
1.2% fenugreek extract
0.2% lovage extract 80% dry substance)
2.4% tamarind powder
2% yeast extract
5% glutamate
51.2% water The mixture is heated during one hour to approximately 80° C. and is filtered after cooling.

The product has a rounded, excellent HVP-like taste that is equal or even superior to that of classical HVPs.

EXAMPLE 7

By mixing the dry components without the addition of water, a dry product is obtained that may replace granulated bouillon or similar dried HVP powders.

7a)
10 to 50% soy sauce powder
10 to 50% fish sauce powder
1 to 5% tamarind powder
1 to 30% yeast extract powder
1 to 30% fenugreek seeds, ground, roasted
10 to 20% salt 7b)
20 to 60% soy sauce powder
1 to 5% tamarind powder or citric acid
1 to 30% yeast extract powder
1 to 30% fenugreek extract
10 to 20% salt
1 to 5% glutamate 7c)
20 to 60% fish sauce powder
1 to 5% tamarind powder or tartaric acid
0.1 to 5% lovage extract or roots, ground
1 to 30% fenugreek seeds, ground
10 to 20% salt

We claim:

1. A condiment containing no HVP-flavoring lactone, having a HVP-like taste and consisting essentially of from about 5 to about 20% salt, from about 1 to about 30% ground fenugreek seeds, from about 0 to about 80% water, from about 0 to about 70% soy sauce and from about 0 to about 70% fish sauce, wherein the total combined percent by weight of the soy sauce and fish sauce in the condiment is from about 10 to about 85%.

2. A condiment according to claim 1, which further comprises from about 0.1 to about 10% lovage root or from about 0.1 to about 10% ground celery leaves or from about 0.1 to about 10% tamarind powder or from about 0.1 to about 5% citric acid or from about 1 to about 30% yeast extract or from about 1 to about 10% glutamate, and combinations thereof.

3. A condiment containing no HVP-flavoring lactone, having a HVP-like taste in liquid form and containing:
a) about 10 to about 50% soy sauce,
b) about 5 to about 50% fish sauce,
c) about 10 to about 20% common salt,
d) about 1 to about 30% fenugreek extract,
e) about 20 to about 70% water,
f) about 0.1 to about 5% lovage extract,
g) about 1 to about 5% tamarind powder,
h) about 1 to about 30% yeast extract, and
i) about 2 to about 8% glutamate.

4. A condiment containing no HVP-flavoring lactone, having a HVP-like taste in solid form and comprising about 0 to about 60% soy sauce powder and about 0 to about 60% fish sauce powder, wherein the above components comprise about 20 to about 85% of the total weight, and which further comprises about 10 to about 20% common salt, about 1 to about 30% fenugreek, about 1 to about 5% tamarind powder or citric acid, about 0 to about 30% yeast extract powder, about 0 to about 5% glutamate, and about 0 to about 5% lovage powder.

5. A condiment containing no HVP-flavoring lactone, having a HVP-like taste in liquid form, containing:
a) about 10 to about 15% soy sauce,
b) about 5 to about 10% fish sauce, c) about 15 to about 20% common salt,
d) about 1 to about 5% fenugreek extract,
e) about 50 to about 55% water,
f) about 0.1 to about 0.5% lovage extract,
g) about 2 to about 5% tamarind powder,
h) about 1 to about 3% yeast extract, and
i) about 4 to about 6% glutamate.

6. A liquid condiment containing no HVP-flavoring lactone, having a HVP-like taste consisting essentially of from about 10 to about 30% soy sauce, from about 10 to about 20% salt, from about 8 to about 16% ground fenugreek seeds and from about 40 to about 60% water.

7. The condiment according to claim 6, wherein the ground fenugreek seeds include roasted, ground fenugreek seeds.

8. The condiment of claim 6 which further comprises fish sauce.

9. The condiment of claim 6 which further comprises from about 2 to about 15% fish sauce.

10. A liquid condiment containing no HVP-flavoring lactone, having a HVP-like taste consisting essentially of from about 10 to about 30% fish sauce, from about 10 to about 20% salt, from about 8 to 16% ground fenugreek seeds and from about 40 to about 60% water.

11. The condiment of claim 10 wherein the fenugreek seeds are roasted.

12. A liquid condiment containing no HVP-flavoring lactone, having a HVP-like taste consisting essentially of from about 10 to about 30% soy sauce, from about 10 to about 20% salt, from about 1 to about 5% fenugreek extract, and from about 50 to about 70% water.

13. A liquid condiment containing no HVP-flavoring lactone, having a HVP-like taste consisting essentially of from about 10 to about 30% fish sauce, from about 2 to about 20% salt, from about 0.1 to about 5% fenugreek extract and from about 50 to about 70% water.

14. The condiment of claim 13 which further comprises from about 2 to about 15% fish sauce.

* * * * *